United States Patent
Lidow (10) Patent No.: US 9,886,732 B2
(45) Date of Patent: Feb. 6, 2018

(54) SYSTEMS AND METHODS FOR PIXEL-BASED WATERMARKING

(71) Applicant: AppNexus Inc., New York, NY (US)

(72) Inventor: Arel Lidow, New York, NY (US)

(73) Assignee: AppNexus Inc., New York, NY (US)

( * ) Notice: Subject to any disclaimer, the term of this patent is extended or adjusted under 35 U.S.C. 154(b) by 90 days.

(21) Appl. No.: 14/879,474

(22) Filed: Oct. 9, 2015

(65) Prior Publication Data
US 2017/0103492 A1    Apr. 13, 2017

(51) Int. Cl.
| | |
|---|---|
| *G06T 1/00* | (2006.01) |
| *G06Q 30/08* | (2012.01) |
| *G06F 17/30* | (2006.01) |
| *G06T 7/40* | (2017.01) |
| *G06T 7/90* | (2017.01) |
| *G06F 21/00* | (2013.01) |

(52) U.S. Cl.
CPC ...... *G06T 1/0021* (2013.01); *G06F 17/30274* (2013.01); *G06F 21/00* (2013.01); *G06Q 30/08* (2013.01); *G06T 7/90* (2017.01); *G06T 2201/0051* (2013.01)

(58) Field of Classification Search
CPC . G06T 1/0021; G06T 7/408; G06F 17/30274; G06Q 30/08
See application file for complete search history.

(56) References Cited

U.S. PATENT DOCUMENTS

| | | | | |
|---|---|---|---|---|
| 6,049,627 A * | 4/2000 | Becker | ............... | G06T 1/005 |
| | | | | 382/181 |
| 6,301,360 B1 * | 10/2001 | Bocionek | ............... | G09C 5/00 |
| | | | | 380/28 |
| 8,180,667 B1 * | 5/2012 | Baluja | ............... | G06Q 30/0217 |
| | | | | 705/14.19 |
| 8,417,568 B2 * | 4/2013 | Nong | ............... | G06Q 30/02 |
| | | | | 382/100 |
| 8,560,388 B2 * | 10/2013 | Yeh | ............... | G06F 17/3087 |
| | | | | 705/14.43 |
| 9,129,313 B1 * | 9/2015 | Farmer | ............... | G06Q 30/0275 |
| 9,336,551 B1 * | 5/2016 | Hegg | ............... | G06Q 30/08 |
| 9,536,250 B2 * | 1/2017 | Jaladanki | ............... | G06Q 30/0251 |
| 2002/0073008 A1 * | 6/2002 | Dutta | ............... | G06Q 10/0875 |
| | | | | 705/37 |

(Continued)

*Primary Examiner* — Sean Conner
*Assistant Examiner* — Pinalben Patel
(74) *Attorney, Agent, or Firm* — Goodwin Procter LLP (57) ABSTRACT

Systems and methods for pixel-based watermarking are disclosed. An online advertising platform, at a first time, receives information identifying a creative that is associated with an advertiser or publisher, and associates a unique identifier with the creative. The color of one or more pixels in the creative image are modified based on the unique identifier by, for example, converting the unique identifier to a corresponding color value and setting the pixels to the color. At a second, later time, the platform receives a second image comprising at least a portion of the creative image. One or more pixels are identified in the second image that correspond to pixels in the first image that were modified in color, and the unique identifier is derived based on the color of the identified pixels in the second image. Information associated with the advertiser or publisher is then retrieved based on the determined identifier.

16 Claims, 3 Drawing Sheets

(56) References Cited

U.S. PATENT DOCUMENTS

| | | | |
|---|---|---|---|
| 2002/0097436 A1* | 7/2002 | Yokoyama | H04N 1/644 358/2.1 |
| 2003/0123696 A1* | 7/2003 | Matsumoto | H04N 1/00867 382/100 |
| 2003/0197780 A1* | 10/2003 | Iwaki | G06T 1/0021 348/36 |
| 2011/0213673 A1* | 9/2011 | Eydelman | G06Q 30/08 705/26.3 |
| 2013/0073400 A1* | 3/2013 | Heath | G06Q 30/02 705/14.73 |
| 2015/0161405 A1* | 6/2015 | Cholleti | G06F 21/62 726/28 |
| 2015/0302486 A1* | 10/2015 | Foufas | G06Q 30/02 705/14.25 |
| 2015/0324946 A1* | 11/2015 | Arce | G06T 1/0021 382/251 |
| 2015/0363380 A1* | 12/2015 | McNaught | G06F 17/248 715/235 |

\* cited by examiner

SYSTEMS AND METHODS FOR PIXEL-BASED WATERMARKING

BACKGROUND

The present disclosure relates generally to digital images and, more particularly, to systems and methods for pixel-based watermarking of online advertising creative images.

With millions of digital advertisements served daily to consumers through web browsers, mobile applications, and other mediums, quality control of ad content, format, and delivery method is an intricate and imperfect process. Although various methods are used to standardize and control the types of advertisements that are permitted to be served to consumers through different platforms and mediums, on occasion an image, video, or other advertising creative is served which is displayed incorrectly, contains indecent content, is unreasonably intrusive, or has some other negative effect. Given the volume of advertising content that passes through ad serving networks, it can be particularly difficult to track down the source of an offending ad, especially if the ad receiver can do little more than provide a screenshot of the ad.

BRIEF SUMMARY

Systems and methods for pixel-based watermarking are disclosed. In one aspect, a computer-implemented method includes: receiving, at a first time, information identifying a creative comprising a first image, the creative being associated with an advertiser or a publisher; associating a unique identifier with the creative; selecting a pixel at a location in the first image; modifying a color of the pixel at the location in the first image based on the unique identifier; receiving, at a second time later than the first time, a second image comprising at least a portion of the creative image; identifying a pixel at a location in the second image corresponding to the pixel at the location in the first image; determining the unique identifier based on a color of the pixel at the location in the second image; and retrieving information associated with the advertiser or the publisher based on the determined unique identifier.

Modifying a color of the pixel at the location in the first image based on the unique identifier can include converting the unique identifier to a value representing a second color; and setting the color of the pixel in the first image to the second color. The location in the first image can include a fixed coordinate-based location. The value can include a hexadecimal representation of the second color.

Determining the unique identifier based on a color of the pixel at the location in the second image can include determining a value representing the color of the pixel at the location in the second image; and converting the value to the unique identifier.

In one implementation, the modifying includes modifying a color of a plurality of pixels at a plurality of locations in the first image based on the unique identifier; the identifying includes identifying at least one pixel at a location in the second image corresponding to at least one pixel at one of the locations in the first image; and the determining includes determining the unique identifier based on a color of the at least one pixel at the location in the second image. At least a subset of pixels in the plurality of pixels can be non-contiguous. The plurality of pixels can include a two-dimensional pattern.

In another implementation, the method further includes holding an auction for serving the creative to an impression consumer; associating a second unique identifier with the auction; selecting a pixel at a second location in the first image; and modifying a color of the pixel at the second location in the first image based on the second unique identifier. The method can further include identifying a pixel at a second location in the second image corresponding to the pixel at the second location in the first image; determining the second unique identifier based on a color of the pixel at the second location in the second image; and retrieving information associated with auction based on the determined second unique identifier.

Other implementations of the foregoing aspects include corresponding systems and computer programs. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described herein in various implementations are systems and methods for pixel-based watermarking of online advertising creative images. As referred to herein, a creative can include an advertisement or other content in the form of an image, video, animation, or other media that can be served to an impression consumer through a web browser, mobile native application, or other means of providing advertising content to a user. In some implementations, a creative includes a data structure, container, or other object in an online advertising platform that includes the advertising content or a reference thereto, as well as other information associated with the creative including, but not limited to, an advertiser or publisher associated with the ad content, a unique identifier for the creative, advertising brand, associate ad campaigns, ad content format, ad content dimensions, tracking pixels, and audit status.

Figure 1:
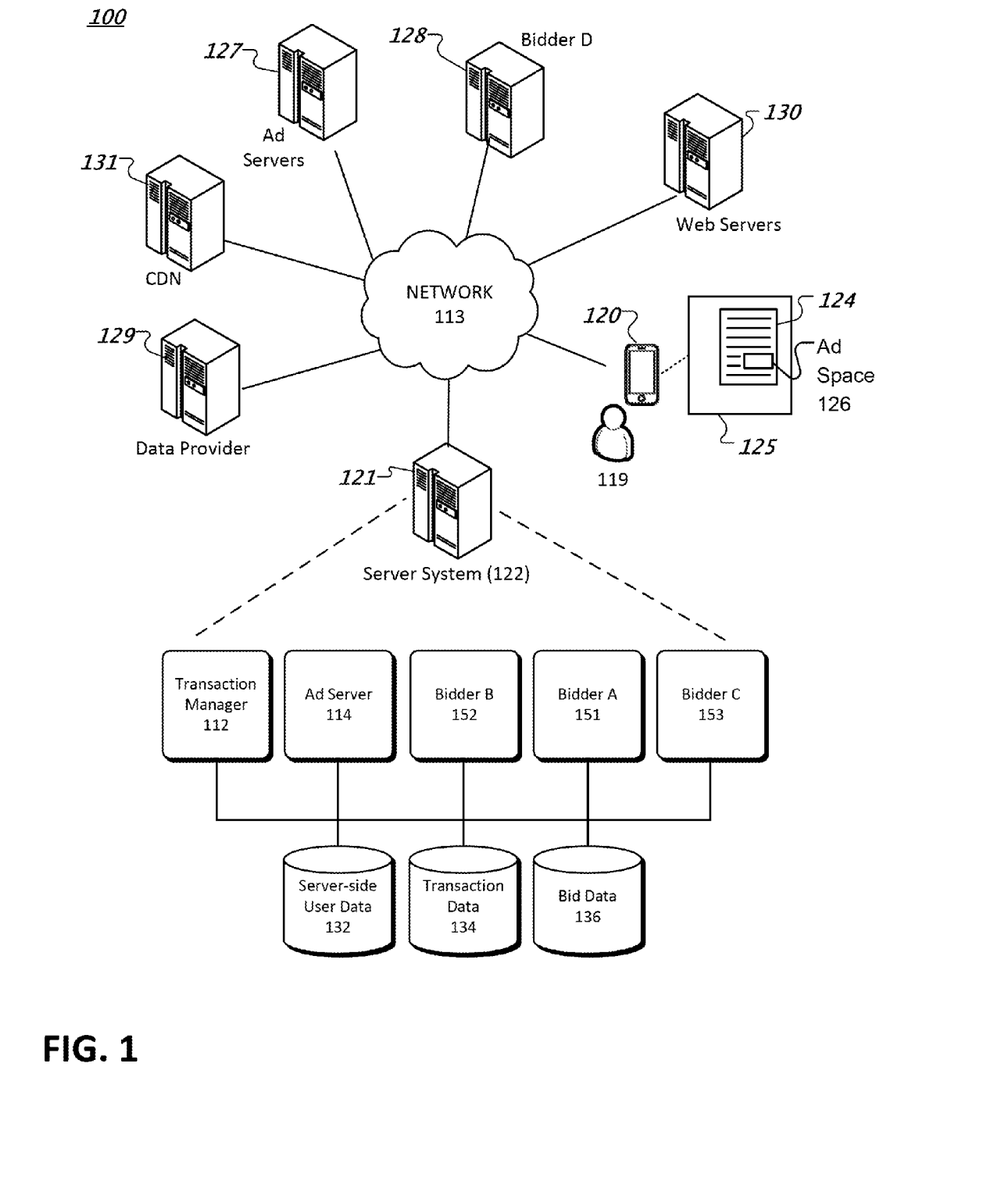
FIG. 1 depicts an example system architecture for an advertising platform according to an implementation.

Advertising creatives can be provided by ad servers or other content delivery servers in digital ad space that is, for example, pre-purchased as part of a block of impression inventory or purchased in a real-time bidding auction for the particular impression. FIG. 1 illustrates an example system 100 for impression auctions. A server system 122 provides functionality for real-time impression inventory data packaging and auctions. The server system 122 comprises software components and databases that can be deployed at one or more data centers 121 in one or more geographic locations, for example. The server system 122 can utilize appropriate hardware or software and can execute, for example, on one or more server class computers that have sufficient memory, data storage, and processing power and that run a server class operating system (e.g., Oracle® Solaris®, GNU/Linux®, and the Microsoft® Windows® family of operating systems).

The server system 122 implements an online advertising platform having software components that comprise a transaction manager 112, ad server 114, and one or more bidders (e.g., bidder A 151, bidder B 152, and bidder C 153). The server system 122 can also include one or more software components for load balancing tools and security tools. The load balancing tools manage traffic within a single data center or among multiple data centers. The security tools manage data protection and access privilege for tenants served by the data centers 121. The software components can include subcomponents that can execute on the same or on different individual data processing apparatuses. The server system 122 databases comprise a server-side user data database 132, transaction data database 134, and bid data database 136. The databases can reside in one or more physical storage systems.

The transaction manager 112 (also referred to herein as an "impression bus" or simply "Imp Bus") is an auction system that facilitates the transaction aspects of ad space inventory and impression trading between buyers and sellers. A buyer can be an advertiser (e.g., a credit card company, a sportswear company), an ad network, or an advertising agency, for example. Other buyers are contemplated. A seller can be a publisher (e.g., newspaper or social network), an online streaming or gaming service, or an ad network. Other sellers are contemplated. The transaction manager 112 processes ad requests received from web browsers or other software applications displaying content from publishers, sends relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 112 can store in the transaction data database 134 various transaction information for each impression that is handled by the transaction manager 112 or other software components of the server system 122.

The ad server 114 is a software component that serves creative content to web pages or other applications. The ad server 114 can also make decisions about what creatives to serve, and track clicks or other user interactions with creatives, for example. As noted above, a creative can include a visual or audio advertisement such as an image, an animation, a video clip, or an audio clip, although other types of creative content are contemplated.

A bidder system or bidder (e.g., bidder A 151) is a software component that, on behalf of a buyer, performs bidding operations. The bidder takes various pieces of bid-specific information (e.g., maximal bid price, target user areas or segments, start and end dates, budget) as input and generates a bid for a particular item of an impression inventory, for example. A buyer can set up (e.g., through an API or web pages provided by the server system 122) a campaign targeting certain types of impressions with a set of bid-specific information for the impressions and store the bid-specific information in bid data database 136. In some implementations, a bidder can be remote from the server system 122, such as bidder D 128. Here, impression inventory can be a collection of one or more ad spaces on web pages served by a publisher's web site. Impression inventory can also be a collection of one or more ad spaces in user interfaces presented by a software application published by a publisher. Other collections of ad spaces of impression inventory are contemplated.

The transaction manager 112 conducts an auction when receiving an ad request for filling an available ad space. By way of illustration, a graphical user interface 124 of a software application 125 executing on client device 120 of a user 119 can include an ad space 126 and a corresponding ad tag. The application 125 can be a web browser application, or a software application such as a game application or a maps application. The application 125 can be implemented in various forms, for example, it can be in the form of a native application, web page, widget, and/or Java, JavaScript, .Net, Silverlight, Flash, and/or other applet or plug-in that is downloaded to the device and runs in conjunction with a web browser. Examples of commercially available web browser software include Microsoft® Internet Explorer®, Google® Chrome®, Mozilla® Firefox®, and Apple® Safari®. In one example, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are contemplated. Here, the client device 120 can be a mobile phone, a smartwatch, smart glasses, a tablet computer, a personal computer, a game console, a television, or an in-car media system. Other examples of a client device are contemplated.

In some implementations, an ad tag comprises a Uniform Resource Locator (URL) from which an ad will be requested (e.g., a URL for the server system 122), Hypertext Markup Language (HTML) statements and/or JavaScript instructions for retrieving and displaying a creative (e.g., displaying the creative in a 160×600 iframe). The application 125 running on the client device 120 can retrieve content in the user interface 124 (e.g., a web page) through one or more data communication networks 113 such as the Internet, for example, from web servers 130 of a publisher. The ad tag causes the application 125 to send (e.g., through the networks 113) an ad request ("ad call") to the server system 122. In some implementations, the application 125 sends an ad request to the server system 122 via another advertising server system such as an ad exchange. The ad request can include information about the available ad space 126 (e.g., a size for the ad space, an identifier for the publisher), user information (e.g., an identifier of the user 119, an Internet Protocol or IP address), and system information (e.g., types of the browser and the client device), for example. The ad request can be composed in JavaScript Object Notation (JSON) or Extensible Markup Language (XML) format and transmitted to the server system 122 using Hypertext Transfer Protocol (HTTP) protocol (e.g., using HTTP POST request method). Other ad request formats and transmission methods are contemplated.

Data associated with the ad space 126 can include data associated with the user 119 such as user segment data and user behavioral data. User segment data include demographic information such as age, gender, location, school, and work. Other user segment data are contemplated. User behavioral data can include data associated with a user's online activities, for example, that the user put a toy in a shopping cart, the user searched for a toy, the user visited an online toy store yesterday, and a frequency the user searched for a toy. Other user behavioral data is contemplated.

Data associated with the ad space 126 can also include contextual data of the user interface 124. For instance, contextual data can include type of the user interface 124 (e.g., a home page, a user interface of a game application), structure of the user interface 124 (e.g., a number of ads on the user interface 124), and content of the user interface 124 (e.g., game, finance, sports, travel, content not suitable for children). Other contextual data is contemplated.

User segment data such as demographic information can be provided by a user to a publisher when the user accesses websites or applications published by the publisher. User segment data such as location can also be determined by data associated with the user's client device (e.g., client device 120) such as an Internet Protocol (IP) address associated with the client device. User behavioral data can be collected by software executed by an application (e.g., application 125) on a user's client device (e.g., client device 120). Contextual data of a user interface (e.g., a web page presented by the client application 125) can be determined by analyzing content (e.g., words, semantics) presented in the user interface.

A buyer (or a seller) can acquire data associated with an ad space from the ad space's publisher or from a data provider (e.g., Proximic of Palo Alto, Calif.). In various implementations, the buyer (or the seller) can store user data in the server-side user data database 132. For instance, the buyer can store in the server-side user data database 132 mappings between user identifiers and user segments.

In response to the ad request, the transaction manager 112 generates a bid request including information about the impression, the user, and so on, and sends the bid request to multiple bidders such as bidder A 151 and bidder B 152. The transaction manager 112 can also send the bid request through the networks 113 to servers of bidder D 128, which is external to the server system 122. The bid request can be composed in JSON format and sent to bidders using HTTP POST. The bid request can also be encoded or compressed. Other bid request formats and transmission methods are contemplated.

Each bidder can determine an appropriate bid based on its own requirements (e.g., budget, targets in placements) and submit a bid response including a bid price and an identifier of a creative to be served, for example, to the transaction manager 112 (or not to respond at all). The transaction manager 112 determines a winning bid (e.g., a highest bid) among bid responses received within a specified time period (e.g., 100 milliseconds). The transaction manager 112 then returns a creative of the winning bid to the client device 120, causing the application 125 to display the creative in the ad space in the user interface 124. The transaction manager 112 can also return a URL for a creative of the winning bid to the client device 120, causing the application 125 on the client device 120 to retrieve the creative from an ad server (e.g., ad server 114, or ad servers 127 external to the server system 122), or from servers of a content distribution network (CDN) 131. In various implementations, the transaction manager 112 can store in the transaction data database 134 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Storing of other information associated with transactions is contemplated.

The software can be executed on computing devices, such as server system 122 and other servers and devices described herein, each including a processing unit, a system memory, and a system bus that couples various system components including the system memory to the processing unit. Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. The processor and the memory can be supplemented by, or incorporated in special purpose logic circuitry. The computing devices can also include information carriers suitable for embodying computer program instructions and data, including various forms of non-volatile memory such as semiconductor memory devices (e.g., EPROM, EEPROM, and flash memory devices), magnetic disks (e.g., internal hard disks or removable disks), magneto-optical disks, and CD-ROM and DVD-ROM disks.

Communication networks 113 can include communications media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the client device and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

The system and methods described herein can also be practiced in distributed computing environments, where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The present techniques can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture, such as a non-transitory computer-readable storage medium. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
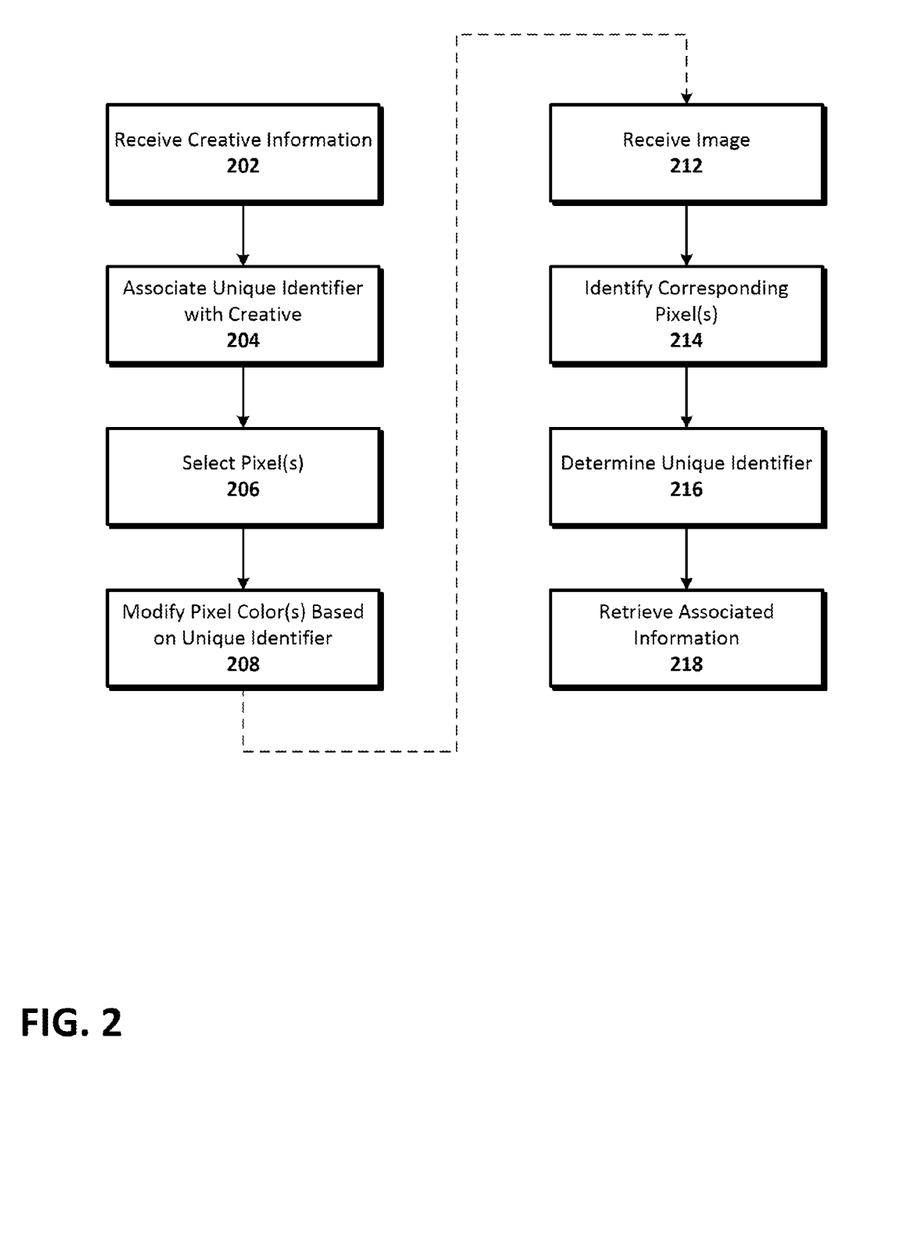
FIG. 2 depicts an example method for pixel-based watermarking according to an implementation.

FIG. 2 depicts an example method for pixel-based watermarking. In one implementation, the transaction manager 112 receives information identifying a creative (STEP 202). The information can be, for example, a reference to a creative image, video, animation, or other creative content, or creative object that includes the creative content or a reference thereto. As earlier described, the creative object can include other information, such as information identifying the advertiser or publisher associated with the creative. The creative can be stored in a manner accessible to the server system 122 and, in particular, to the transaction manager 112. For example, the creative can be stored in the transaction data database 134 or other database local or remote to the transaction manager 112. In STEP 204, the transaction manager 112 assigns a unique identifier to the creative. If the creative includes an object or data structure, the unique identifier can be stored as a field in the object or data structure. The unique identifier can be generated randomly, sequentially, or in another suitable manner.

Figure 3A:
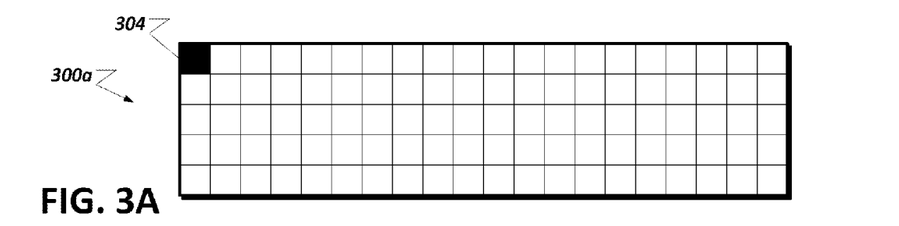
FIGS. 3A-3D depict various examples of pixel selections in a creative image.
Figure 3B:
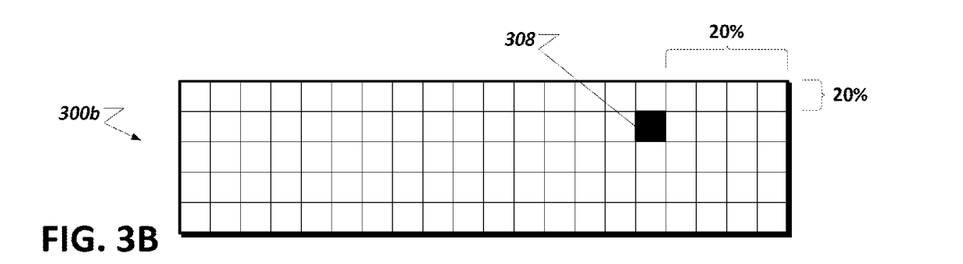
Figure 3C:
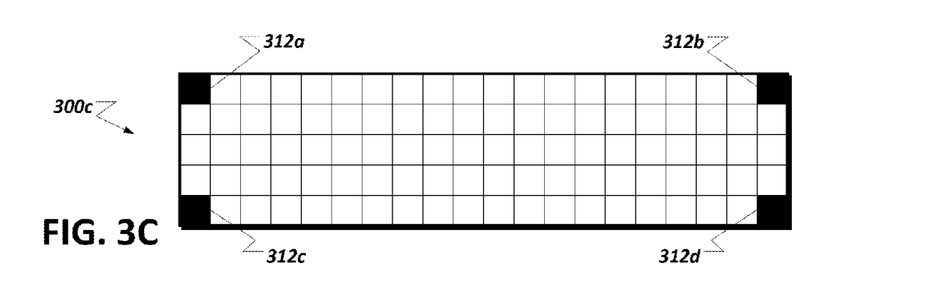
Figure 3D:
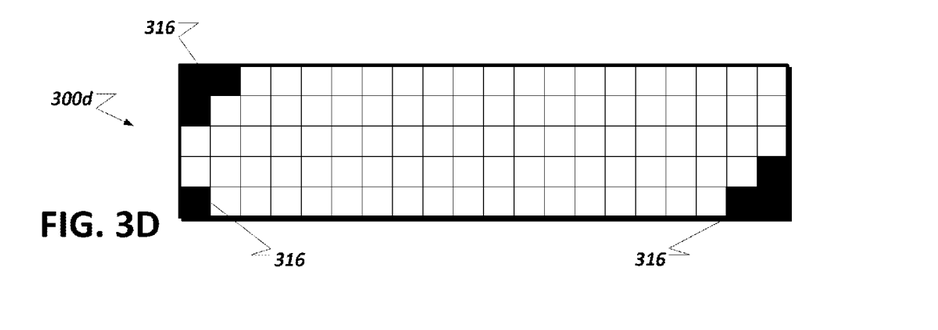

In STEP 206, one or more pixels in the creative image are selected. FIGS. 3A-3D illustrate different possible manners in which the pixel(s) can be selected in an image. For example, referring to FIG. 3A, a single pixel 304 of image 300a can be selected in a fixed, coordinate-based location (i.e., (0, 0), or the top-left corner of the image 300a). Other pixel locations are contemplated, such as any corner of the image 300a, a single or multiple pixel offset from a particular corner, the approximate center pixel of the image 300a, and so on. As shown in FIG. 3B, another location for a selected pixel 308 in an image 300b is at a particular percentage offset from a corner of the image 300b (e.g., down and in from the top-right corner by a number of pixels equal to 20% of the height and width, respectively). Multiple pixels can also be selected that include various combinations of the foregoing and/or other pixel locations, such as all four corner pixels 312a-312d of an image 300c (see FIG. 3C), two diagonal corner pixels, and so on. Selected pixels can be contiguous, non-contiguous, or a combination of the foregoing (see image 300d of FIG. 3D, depicting selected pixels 316). In some instances, the selected pixels can form a pattern or larger watermark. If the creative is a video or animation, the selected pixel(s) can be the same for each frame.

Referring back to FIG. 2, in STEP 208, the color of at least one selected pixel is modified based on the unique creative identifier. In some implementations, if there are multiple selected pixels, all are changed to the same color (e.g., for redundancy). In other implementations, some or all of the selected pixels are changed to different colors. The new color of each selected pixel can be determined based in some manner on the unique creative identifier associated with the creative or, alternatively, the color of each selected pixel can be determined based on factors other than or in addition to the creative identifier. For example, there can be one or more other identifiers associated with other information.

In one implementation, in order to determine which color to use in modifying a particular selected pixel, the creative unique identifier can be converted to a value that represents a color. As one example, if the unique identifier is represented as a base-10 integer (e.g., 15462243), the integer can be converted to a hexadecimal value (i.e., #EBEF63). Six-character hexadecimal values are commonly used to represent colors in, for example, the web development and image editing fields and, accordingly, the color of the selected pixel can be changed to reflect the color represented by the hexadecimal value. It should be appreciated that there are numerous ways to represent colors as numerical values, text, or otherwise and, as such, various other methods for converting a unique identifier to a color are contemplated. The conversion can be readily reversible, such that the color can be converted back to the unique identifier. In other implementations, the unique identifier itself is a color value and no conversion is necessary.

In some implementations, it may be desirable to mask the unique identifier in some manner so that it is not trivial for a person to determine the identifier based on the color of a pixel. For example, rather than having a direct, single-step conversion between the identifier and a color value (e.g., integer to hexadecimal), additional operations can be performed to further obscure the identifier. This can be as simple as performing an XOR operation on the identifier before converting it to a color value, or can include using the unique identifier as input to a complex, reversible algorithm that outputs a color value. In the case of multiple identifiers used to recolor multiple pixels, a reversible algorithm that uses all of the identifiers as input can output multiple corresponding color values. The foregoing algorithm can be constructed so that multiple output color values are interdependent on multiple input identifiers and, thus, when reversing the operation to derive the original identifiers, some or all of the originally outputted colors can be required as input.

As noted above, pixels can be selected and pixel colors changed based on one or more identifiers. In one implementation, as described above, the server system 122 is configured to execute impression auctions. Information associated with a particular auction can be assigned one or more unique identifiers. For example, the auction itself can have an assigned identifier, as can the winning bidder or all bidders. When holding an auction to serve an advertisement to an impression consumer, upon determining a winning bid and identifying the creative to be served to the consumer, the color of one or more selected pixels can be changed based on the unique identifier associated with the auction and/or the winning bidder. The pixel(s) can be selected and the color(s) modified in the same manner as described above with respect to the pixel(s) selected and color-modified based on the unique creative identifier. Further, the pixel(s) can be selected and the color(s) modified in addition to or instead of modifying pixel color based on the unique creative identifier.

The selection and color modification of pixels can be performed at various times, for example, when a creative object is first created in the server system 122 or when the creative is being served to an impression consumer. In one implementation, creatives can be served through a software development kit (SDK) of the online advertising platform. The SDK can use a templating system that allows for operations to be applied to some or all creatives when they are being served. For example, the templating system can include code (e.g., in JavaScript, PHP, or otherwise) that changes the color of one or more pixels of a creative based on a unique creative identifier or other identifier, in the manner described herein.

In STEP 212, at some later point in time (e.g., after the creative has been served to an impression consumer), a new image that contains at least a portion of the original creative is received at the server system 112. For example, the new image can be a screenshot of the advertisement as it appeared to an impression consumer in a web browser, mobile application or otherwise. If the original creative was a video or animation, the portion of the creative can be part or all of a particular frame of the of the video or animation. In STEP 214, one or more pixels at locations corresponding to the locations of the color-modified pixel or pixels in the original creative image are then identified. If, for example, a single pixel at coordinate location (0, 0) was colored in the original creative, the pixel at (0, 0) in the new image can be selected. In some instances, the new image may be cropped or altered in some manner and, thus, if multiple pixels were recolored in the original creative for redundancy, these pixels can be identified, to the extent possible, and compared to determine if they are consistent in coloring with each other.

The unique creative identifier and/or other identifiers is determined in STEP 216 based on the color(s) of the identified pixel(s) in the new image. The identifier(s) can be determined using an operation such as described above in reverse. In a simple example, if the color value of an identified pixel is #EBEF63 in hexadecimal, the unique identifier is that value in base-10 form, or 15462243. Other techniques for converting between a color value and an identifier are contemplated, including those disclosed herein.

In STEP 218, information associated with the original creative is retrieved based on the determined identifier(s). For example, if the identifier is the unique creative identifier, the transaction manager 112 can look up the creative object corresponding to the identifier in the transaction data database 134. As earlier described, the creative object can include information associated with the advertiser or publisher linked to the creative. The determined identifier can also include a unique auction identifier that identifies the auction that resulted in the creative being served. Thus, based on the identifiers derived from the new image, a user of the server system 122 can be provided with information regarding who served the creative, which auction the creative was provided as part of a winning bid, and so on.

In some implementations, the accuracy of an identifier determined from the color of a pixel in the new image can be verified by comparing the new image to the original creative image. As noted above, a creative object or data store can include an associated creative or a reference to a creative (e.g., image, video, etc.). Upon determining a unique creative identifier from a pixel of the new image, the creative object associated with the identifier can be retrieved, and the creative referred to in the object can be compared with the new image to determine if there is a match meeting a particular threshold. Various techniques are known for comparing two images to determine if a full or partial match exists. If the new image and the retrieved creative do not sufficiently match, it is possible that the pixel(s) encoding the identifier were incorrectly identified or cropped out of the image, that a change in quality or format of the new image has resulted in a change in pixel color, or that some other issue occurred such that the identifier cannot be determined. If multiple pixels are identified in the new image as potentially encoding an identifier, they can each be tested to determine if there is a match in the retrieved creative associated with the pixel, or at least until a match, if any, is found.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
    receiving, at a first time, information identifying a creative comprising a first image, the creative being associated with an advertiser or a publisher;
    associating a unique identifier with the creative;
    selecting a pixel at a location in the first image;
    modifying a color of the pixel at the location in the first image based on the unique identifier;
    receiving, at a second time later than the first time, a second image comprising at least a portion of the creative image;
    identifying a pixel at a location in the second image corresponding to the pixel at the location in the first image;
    determining the unique identifier based on a color of the pixel at the location in the second image;
    retrieving information associated with the advertiser or the publisher based on the determined unique identifier;
    holding an auction for serving the creative to an impression consumer;
    associating a second unique identifier with the auction;
    selecting a pixel at a second location in the first image;
    modifying a color of the pixel at the second location in the first image based on the second unique identifier;
    identifying a pixel at a second location in the second image corresponding to the pixel at the second location in the first image;
    determining the second unique identifier based on a color of the pixel at the second location in the second image; and
    retrieving information associated with the auction based on the determined second unique identifier.

2. The method of claim 1, wherein the location in the first image comprises a fixed coordinate-based location.

3. The method of claim 1, wherein modifying a color of the pixel at the location in the first image based on the unique identifier comprises:
    converting the unique identifier to a value representing a second color; and
    setting the color of the pixel in the first image to the second color.

4. The method of claim 3, wherein the value comprises a hexadecimal representation of the second color.

5. The method of claim 1, wherein determining the unique identifier based on a color of the pixel at the location in the second image comprises:
    determining a value representing the color of the pixel at the location in the second image; and
    converting the value to the unique identifier.

6. The method of claim 1:
wherein the modifying comprises modifying a color of a plurality of pixels at a plurality of locations in the first image based on the unique identifier;
wherein the identifying comprises identifying at least one pixel at a location in the second image corresponding to at least one pixel at one of the locations in the first image; and
wherein the determining comprises determining the unique identifier based on a color of the at least one pixel at the location in the second image.

7. The method of claim 6, wherein at least a subset of pixels in the plurality of pixels are non-contiguous.

8. The method of claim 6, wherein the plurality of pixels comprises a two-dimensional pattern.

9. A system comprising:
at least one memory for storing computer-executable instructions; and
at least one processor for executing the instructions stored on the memory, wherein execution of the instructions programs the at least one processing unit to perform operations comprising:
receiving, at a first time, information identifying a creative comprising a first image, the creative being associated with an advertiser or a publisher;
associating a unique identifier with the creative;
selecting a pixel at a location in the first image;
modifying a color of the pixel at the location in the first image based on the unique identifier;
receiving, at a second time later than the first time, a second image comprising at least a portion of the first image;
identifying a pixel at a location in the second image corresponding to the pixel at the location in the first image;
determining the unique identifier based on a color of the pixel at the location in the second image;
retrieving information associated with the advertiser or the publisher based on the determined unique identifier;
holding an auction for serving the creative to an impression consumer;
associating a second unique identifier with the auction;
selecting a pixel at a second location in the first image;
modifying a color of the pixel at the second location in the first image based on the second unique identifier;
identifying a pixel at a second location in the second image corresponding to the pixel at the second location in the first image;
determining the second unique identifier based on a color of the pixel at the second location in the second image; and
retrieving information associated with the auction based on the determined second unique identifier.

10. The system of claim 9, wherein the location in the first image comprises a fixed coordinate-based location.

11. The system of claim 9, wherein modifying a color of the pixel at the location in the first image based on the unique identifier comprises:
converting the unique identifier to a value representing a second color; and
setting the color of the pixel in the first image to the second color.

12. The system of claim 11, wherein the value comprises a hexadecimal representation of the second color.

13. The system of claim 9, wherein determining the unique identifier based on a color of the pixel at the location in the second image comprises:
determining a value representing the color of the pixel at the location in the second image; and
converting the value to the unique identifier.

14. The system of claim 9:
wherein the modifying comprises modifying a color of a plurality of pixels at a plurality of locations in the first image based on the unique identifier;
wherein the identifying comprises identifying at least one pixel at a location in the second image corresponding to at least one pixel at one of the locations in the first image; and
wherein the determining comprises determining the unique identifier based on a color of the at least one pixel at the location in the second image.

15. The system of claim 14, wherein at least a subset of pixels in the plurality of pixels are non-contiguous.

16. The system of claim 14, wherein the plurality of pixels comprises a two-dimensional pattern.

* * * * *